United States Patent [19]

Hsieh

[11] 4,159,977
[45] Jul. 3, 1979

[54] METHOD OF REDUCING THE GEL AND CURE TIMES FOR POLYESTER-ALUMINA TRIHYDRATE DISPERSIONS BY BLENDING THEREWITH SMALL QUANTITIES OF ACTIVATED ALUMINA

[75] Inventor: Hsiun P. Hsieh, Murrysville, Pa.

[73] Assignee: Aluminum Company of America, Pittsburgh, Pa.

[21] Appl. No.: 944,186

[22] Filed: Sep. 20, 1978

[51] Int. Cl.$^2$ .............................................. C08K 3/22
[52] U.S. Cl. ............................ 260/40 R; 260/45.7 R; 525/15
[58] Field of Search ................ 260/40 R, 865, 45.7 R; 106/309

[56] References Cited

U.S. PATENT DOCUMENTS

| | | | |
|---|---|---|---|
| 2,656,250 | 10/1953 | Thibon et al. | 106/309 X |
| 3,677,999 | 7/1952 | Denk et al. | 260/40 R X |
| 3,733,283 | 5/1973 | Duggins | 260/37 N X |
| 3,954,957 | 5/1976 | Koenig | 106/309 X |

OTHER PUBLICATIONS

Bonsignore & Manhart, *Alumina Trihydrate as a Flame Retardant and Smoke Suppressive Filler in Reinforced Polyester Plastics,* (1974), (distributed by Alcoa).
Alcoa, *Activated and Catalytic Aluminas,* (7-14-69).

*Primary Examiner*—Sandra M. Person
*Attorney, Agent, or Firm*—David W. Brownlee; Glenn E. Klepac; William J. O'Rourke, Jr.

[57] ABSTRACT

An improved process for dispersing alumina trihydrate in a polyester resin is disclosed wherein the improvement comprises reducing the times required to accomplish the gelling and curing of a polyester resin by blending two to ten percent activated alumina, based on the total weight of alumina, with the alumina trihydrate.

7 Claims, No Drawings

METHOD OF REDUCING THE GEL AND CURE TIMES FOR POLYESTER-ALUMINA TRIHYDRATE DISPERSIONS BY BLENDING THEREWITH SMALL QUANTITIES OF ACTIVATED ALUMINA

BACKGROUND OF THE INVENTION

1. Field of the Invention

The present invention relates to the processing of dispersions of inorganic fillers in polyester resins and, more particularly, to a method for reducing the times required to accomplish gel and cure of alumina trihydrate filled polyester resins.

2. Description of the Art

Inorganic filler materials, including hydrates such as alumina trihydrate ($Al_2O_3.3H_2O$), are used in large quantities as flame retardant and smoke suppressive fillers for plastics, particularly for thermosetting polyesters. Such materials resist fire and heat and may contain water of hydration which is slowly released therefrom by dehydration in a fire situation. Increased loading of the fillers into the mixture necessarily increases the flame retardant and smoke suppressive qualities of the plastic material.

In preparing polyester-trihydrate dispersions, a polyester resin containing a monomer, such as styrene, is typically mixed with alumina trihydrate in approximately equal quantities. Smaller amounts of fillers or pigments may be added to the mixture. Then a catalyst, such as methyl ethyl ketone peroxide, is added to cause the resin to react with the monomer resulting in the extension and crosslinking of the molecular chains creating a three dimensionally chained structure. The structure is cured to form a rigid, infusible thermosetting material. Curing may be achieved by exposing the structure to radiation, ultraviolet light and heat or by using a room temperature catalyst. Unless the catalyst is used in conjunction with a proper promoter or accelerator, the resin polymerizes very slowly. Therefore, promoters are often used to speed the reaction at room temperature.

The curing of polyester thermosetting polyester resins proceeds in two distinct stages. The first is the formation of a soft gel from a fluid consistency. The time required to reach gelling from the point of adding the catalyst is called the gel time. Soon after the gelation, the second phase of the cure takes place with considerable evolution of heat. The time measured from the moment of catalyst addition to the point of the peak temperature is called peak time or sometimes referred to as cure time. The gel time and the peak time, especially the former, represent two important properties of the curing process. Most of the polyester resins are cured at room temperature. Consequently, a promoter, such as cobalt naphthenate or cobalt octoate, is typically used to speed the curing reaction. Use of more promoter in the formulation of an alumina trihydrate filled polyester resin decreases the time required to cure the polyester resin. However, too much use of the promoter may have adverse effects by measurably shortening the shelf life of the resin, not providing good control for the curing process and creating poor mixing and poor fiberglass wet-out. Not until the resin is gelled can the molded parts be easily handled. It can thus be seen that a long gel time slows down the operation. Accordingly, an improved method for dispersing alumina trihydrate in a polyester resin is desired that will result in shorter gel time and peak time, thereby reducing the time required to accomplish the curing operation without using more promoter in the dispersion.

SUMMARY OF THE INVENTION

This invention may be summarized as providing an improved process for dispersing alumina trihydrate in a polyester resin wherein the improvement comprises reducing the time required to polymerize the polyester resin by blending two to ten percent activated alumina, based on the total weight of alumina, with the alumina trihydrate.

An advantage of the present invention is the reduction in the time required to accomplish the curing of a polyester resin.

Another advantage of the present invention is that the gel and cure times are reduced without increasing the amount of promoter in the mixture.

It follows that an objective of the present invention is to reduce the gel and cure times and thereby increase the production rate for alumina trihydrate filled polyester products.

A further advantage of the present invention is that the gel and cure times are lowered without significantly affecting the fire retardancy or smoke suppressive characteristics of the final product.

Another advantage of the process of the present invention is that it is economical, in that the cost of activated alumina that can be employed to decrease the gel and cure times is relatively inexpensive.

These and other objectives and advantages of this invention will be more fully understood and appreciated with reference to the following description.

DESCRIPTION OF THE PREFERRED EMBODIMENTS

Alumina trihydrate-polyester resin dispersions are used primarily in two areas, in polyester spraying applications and in the area of molding compounds. Spraying, or spray-up as it is commonly called, is a simple and economic molding process for fiberglass reinforced polyester products, such as bathtubs and shower stalls. In such applications, the alumina trihydrate is used in part for flame retardancy and smoke suppression that is typically required to meet the standards required of various building codes.

Basically the alumina trihydrate and the polyester resin are mixed in a drum or the like. The polyester resins may contain additives, such as promoters or thixotropic agents. The mixture is fed through a tube or hose to a spray gun. At the gun and just prior to discharge therefrom, the trihydrate polyester dispersion is mixed with a catalyst, methyl ethyl ketone peroxide, for example. The mixture is then sprayed under a pressure of about 415 kPa (60 psi) onto a waxed mold. Simultaneously, chopped fiberglass strands, approximately 0.635 cm (¼ inch) to 2.54 cm (1 inch) in length, are injected into the spray for concurrent application. A layer of smooth gel coat, acrylics, and cast polyester is typically applied onto the waxed mold surface prior to spraying for cosmetic effect and for impact and corrosion resistance. After the desired thickness is achieved, the sprayed resin may be rolled against the mold to remove entrapped air and to insure uniformity. Typically, the sprayed resin cures or becomes polymerized due to the action of a room temperature catalyst and a promoter.

It will be understood by those skilled in the art that mixtures exhibit low viscosities in order to be sprayed easily and evenly. Also, entrapped air is easily removed during rolling of low viscosity mixtures, and uniformity is accurately achieved when rolling such low viscosity mixtures.

Thermosetting plastics, such as unsaturated polyester resins, are involved in a chemical reaction during processing which results in the extension and cross linking of the molecular chains. To understand the curing mechanism of thermoset polyester, it should be understood that the long chain, linear unsaturated polyester, as shown below:

reacts with a monomer, such as styrene, at the reactive double bonds to form a rigid, infusible thermosetting material, as shown below:

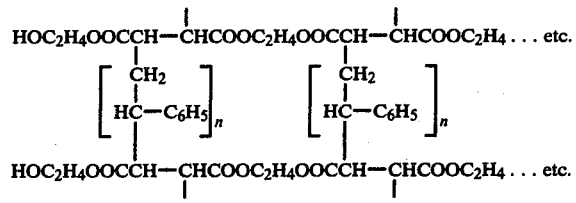

For polyester spraying applications, resin, hydrate and fiberglass are typically used in the following concentrations:

| Material | Concentration |
|---|---|
| polyester resin | 50% by weight of resin and hydrate including about 45% to 50% of a monomer, such as styrene, based on weight of the resin |
| alumina trihydrate | 50% by weight of resin and hydrate |
| fiberglass | 10–20% by weight of resin, hydrate and fiberglass |

With the presence of a catalyst in the system, the cross linking creates a three dimensionally chained structure. Cure of the polyester resin is preferably accomplished at room temperature, but may also be achieved by exposure to ultraviolet light and heat or by radiation.

The prior art suggests that the curing reaction of the unsaturated polyester resins follows a surface mechanism in which the gel time and the peak time are shortened when more solid surface area of the alumina trihydrate is available for the curing resin. Higher total surface area of the trihydrate may be achieved by a variety of methods. By decreasing the particle size of the alumina trihydrate, for example, the overall surface area is increased. However, use of fine particle size trihydrate increases the viscosity of the polyester trihydrate dispersion and is therefore not desired. Partial dehydration of the trihydrate particles also increases the overall surface area. However, experimental results indicated that the loss on ignition (LOI) of the alumina trihydrate had to be less than about 30% to appreciably reduce the gel and peak times. LOI is defined as the weight loss which occurs upon heating a sample from 110° C. to 1,100° C. and is interpreted as the amount of chemically bound water remaining on the hydrated alumina. For a normally produced trihydrate, the LOI is in the range of about 34.6 to 34.8%. At an LOI less than about 30%, the flame retardancy of the dehydrated products may be deteriorated.

It has been discovered that by blending a small percentage, from two to ten percent, of activated alumina, i.e. alumina trihydrate having an LOI of less than or equal to 10%, with the regular trihydrate, the time required to accomplish the gelling and curing of a polyester resin can be reduced without adversely affecting viscosity or flame retardancy. It is believed that pores are formed in the production of activated alumina which provide a significant increase in the specific surface area. See Table I.

TABLE I

| Example | Total % Alumina | Total % Polyester Resin[1] | % Trihydrate Base[2] | % Trihydrate Activated[3] | Times[4] Gel | Times[4] Peak | Brookfield Viscosity[5] |
|---|---|---|---|---|---|---|---|
| 1 | 50 | 50 | 100 | 0 | 17 | 27 | 1,750 |
| 2 | 50 | 50 | 95 | 5 | 11 | 20 | 1,700 |
| 3 | 50 | 50 | 90 | 10 | 7 | 15 | 1,850 |

[1]Koppers B304-60 general purpose polyester resin containing about 49% monomer (styrene)
[2]4.2 micron median particle size by Sedigraph, manufactured by Micromeritics of Atlanta, Georgia, LOI of 34.7%
[3]LOI of 8%
[4]minutes at 1% methyl ethyl ketone peroxide at 25° C.
[5]centipoises at 20 rpm, spindle no. 3 at 25° C.

As shown in the table, at 50% trihydrate loading and at one phr (part per hundred parts resin) of methyl ethyl ketone peroxide, the addition of 5% and 10% activated alumina with 95% and 90% regular alumina trihydrate, respectively, significantly reduces both the gel time and the peak time. In the base condition, set forth in Example 1, only a 4.2 micron median diameter alumina trihydrate having an LOI of 34.7% is used. The gel time and peak time under such base condition are 17 minutes and 27 minutes, respectively. By adding 5% activated alumina, with an LOI of about 8%, to 95% of the 4.2 micron regular alumina trihydrate, as set forth in Example 2, a gel time of 11 minutes is obtained without experiencing any increase in the dispersion viscosity. Even shorter gel and peak times were obtained by adding 10% activated alumina with an LOI of about 8% to 90% of the 4.2 micron regular alumina trihydrate.

For comparison purposes a finer particle size regular alumina trihydrate, specifically 1.8 micron, was dispersed with the polyester resin on a 50:50 basis. The gel and peak times for such dispersions were found to be 11 minutes and 21 minutes, respectively. However, use of such fine particle size regular trihydrate increases the dispersion viscosity significantly from 1,750 centipoises to 7,430 centipoises at 20 rpm Brookfield and at 25° C. As the particle size of the alumina trihydrate decreases, its effect of increasing the viscosity of the dispersion becomes even more pronounced.

It will be understood by those skilled in the art that the overall flame retardancy and smoke suppressing characteristics of the products may be reduced as the activated alumina loading is increased. Therefore, to minimize deterioration in flame retardancy, activated alumina should not be used in concentrations in excess of 10% based on the total weight of the alumina. Preferably, activated alumina with an LOI of from 4 to 8% should be used in concentrations of equal to or less than 5% based on the total weight of the alumina.

Whereas the particular embodiments of this invention have been described above for purposes of illustration, it will be apparent to those skilled in the art that numerous variations of the details may be made without departing from the invention.

What is claimed is:

1. In a process for making an alumina trihydrate filled polyester product comprising the steps of dispersing a polyester resin with up to 65% alumina trihydrate, based on the total weight of the resin and the trihydrate, and a catalyst, the improvement comprising reducing the time required to accomplish the gelling and subsequent curing of the polyester resin by blending from about 2.0 to 10.0 percent activated alumina, based on the total weight of alumina, with the alumina trihydrate prior to the mixing with the polyester resin, said activated alumina having a loss on ignition of less than 10.0 percent.

2. A method as set forth in claim 1 wherein the activated alumina has a loss on ignition of from four to ten percent.

3. A method as set forth in claim 1 wherein about two to five percent activated alumina is blended with the alumina trihydrate.

4. A method as set forth in claim 1 wherein 50 to 60 percent alumina trihydrate, based on the total weight of the resin and the trihydrate, is dispersed with the polyester resin.

5. An improved alumina trihydrate polyester resin dispersion comprising:
   40 to 50 percent polyester resin, based on the total weight of the resin and the trihydrate;
   50 to 60 percent alumina trihydrate, based on the total weight of the resin and trihydrate with from about two to ten percent of said alumina trihydrate, based on the total weight of alumina, activated to a loss on ignition of less than ten percent; and
   up to two percent of a catalyst, based on the total weight of the resin and trihydrate.

6. The dispersion as set forth in claim 5 wherein from about two to ten percent of said alumina trihydrate, based on the total weight of alumina, is activated to a loss on ignition of from four to ten percent.

7. The dispersion as set forth in claim 5 wherein from about two to five percent of said alumina trihydrate, based on the total weight of alumina, is activated to a loss on ignition of less than ten percent.

* * * * *